No. 828,970. PATENTED AUG. 21, 1906.
R. G. ROBERTS.
VEHICLE.
APPLICATION FILED SEPT. 22, 1905.

2 SHEETS—SHEET 1.

WITNESSES:
D. E. Carlsen
C. C. Carlsen

INVENTOR:
Robert G. Roberts
BY his ATTORNEY:
A. M. Carlsen

No. 828,970. PATENTED AUG. 21, 1906.
R. G. ROBERTS.
VEHICLE.
APPLICATION FILED SEPT. 22, 1905.

2 SHEETS—SHEET 2.

WITNESSES:
D. E. Carlsen
E. C. Carlsen

INVENTOR:
Robert G. Roberts
BY HIS ATTORNEY:
A. M. Carlsen

UNITED STATES PATENT OFFICE.

ROBERT G. ROBERTS, OF MINNEAPOLIS, MINNESOTA.

VEHICLE.

No. 828,970.

Specification of Letters Patent.

Patented Aug. 21, 1906.

Application filed September 22, 1905. Serial No. 279,613.

*To all whom it may concern:*

Be it known that I, ROBERT G. ROBERTS, a citizen of the United States, residing at Minneapolis, in the county of Hennepin and State of Minnesota, have invented certain new and useful Improvements in Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in vehicles; and the main object is to provide a vehicle whose main body may be retained, while the upper parts thereof are exchangeable and convertible into several forms for the carrying of various articles, like grain, potatoes, hay, wood, stone, cattle, &c. The invention is especially applicable in connection with wagons used by farmers and is therefore in the accompanying drawings represented as applied to the platform or body of a farm-wagon and comprises also an attachment for carrying hay-slings on when they are not in actual use.

Figure 1:
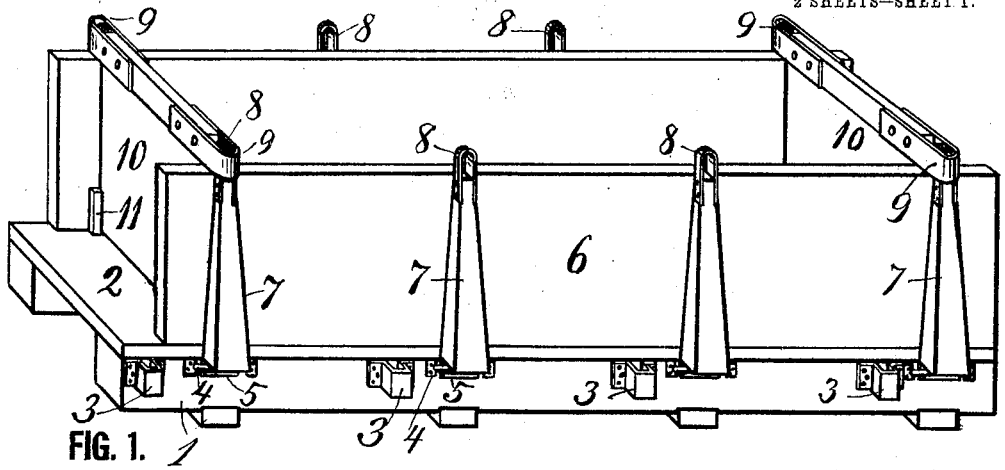
Figure 2:
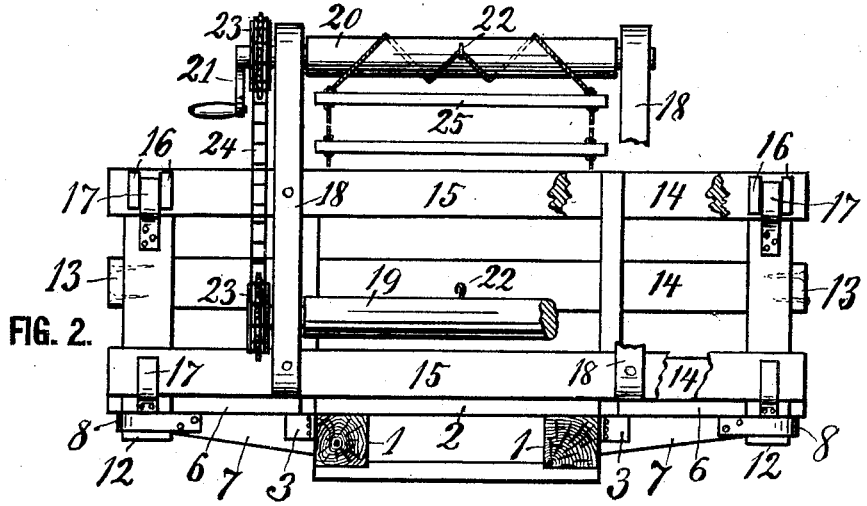
Figures 3, 4:
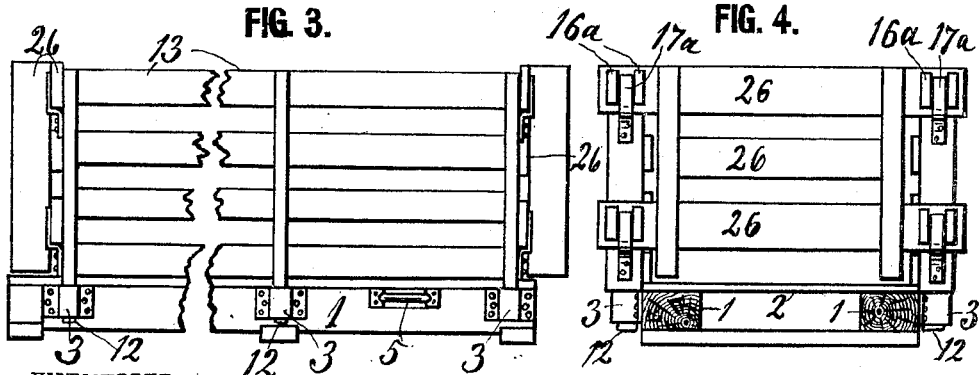
Figure 5:
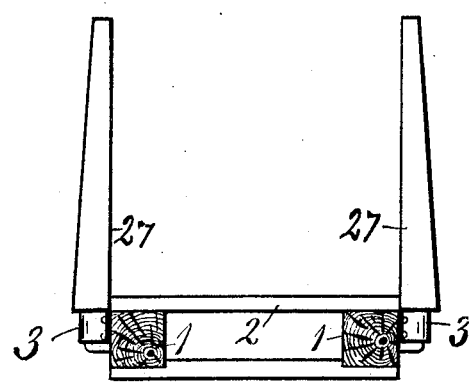
Figure 6:
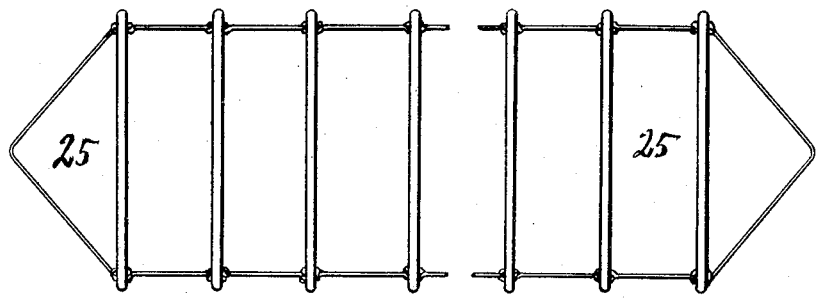
Figure 7:
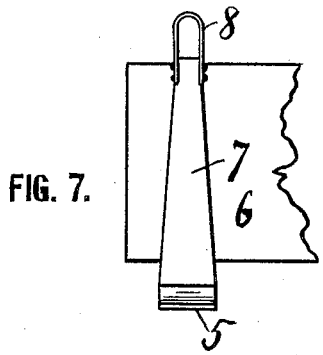
Figure 8:
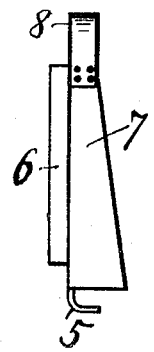

In the drawings, Figure 1 is a perspective view of my improved wagon box or body ready for hauling grain, potatoes, and similar products in it. Fig. 2 is a front end elevation of the wagon-body converted into a hay-wagon with parts of the end broken away.
Fig. 3 is a side elevation, and Fig. 4 an end elevation, of the wagon-body ready for hauling poultry, sheep, and other cattle. Fig. 5 is an end elevation of the wagon-body ready for hauling stone, wood, or other large articles. Fig. 6 is a plan view of one of the hay-slings to be rolled upon the attachment I provide for that purpose. Fig. 7 is a side elevation, and Fig. 8 an end elevation, of an end portion of one of the sides of the box in Fig. 1.
Referring to the drawings by reference-numerals, 1 designates the frame timbers or sills, and 2 the platform or bottom of the wagon-box. The side sills of the frame are provided with stick-pockets 3 and staple-shaped hinge members 4. Into the latter are dropped downwardly the hook-shaped hinge members 5, carried by the solid side pieces 6 of the wagon-box, which pieces have transverse cleats 7, whose enlarged lower ends butt against the side sills and support the side 6 in a horizontal position when it is folded down, as in Fig. 2, while the upper ends of the cleats are provided with metallic loops or pockets 8, which in Fig. 1 receives upon them the loops or eyes 9, fixed at the upper corners of the end-boards 10, the lower corners of the end-boards being held by blocks, like 11, or any other suitable means.

When the side-boards 6 are folded down, as in Fig. 2, the eyes 8 serve as stick-pockets for the projections or legs 12 of the side pieces 13 of the hay-rack, which is formed of said sides and of the front end 14 and rear end 15, both of which have corner blocks or cleats 16, engaging arms 17, secured to the side pieces, which are thereby held steady.

Upon the rear end of the hay-rack are secured two uprights 18, in which are journaled two rollers 19 and 20, the latter provided with a hand-crank 21, and each of them provided with a hook 22. The rollers are preferably geared together by sprocket-wheels 23 and a chain belt 24 to revolve in unison. Upon said rollers are wound, as indicated on the upper roller, the regular hay-slings 25 (best shown in Fig. 6) when they are not in actual use, which arrangement saves wear and tear of the slings by having them drawn on the ground behind the wagon, as has heretofore been the practice. By removing the hay-rack in Fig. 2 the remaining side-boards 6 and bottom 2 constitute a very large flat cart or wagon for hauling stumps, roots, trees, corn on the stalk, grain in bundles, &c.

In Figs. 3 and 4 it will be seen that a very complete cattle and poultry wagon is formed by removing the side-boards 6 in Fig. 2, placing the legs of the skeleton sides 13 into the pockets 3 and substituting the short skeleton ends, like 26, in Fig. 4 for the longer ones in Fig. 2.

In Fig. 5 the wagon is converted into a truck for hauling wood, lumber, large rocks, boxes, barrels, &c.

It is obvious that the frame and platform upon which I have illustrated my invention may be mounted upon runners as well as upon axles and wheels. I therefore do not mean to limit the use of the invention to wheeled vehicles only, although it may be mainly used for farm-wagons, and when so used it is readily understood that the farmer saves the great expense of purchasing the expensive wheels, axles, framework, and bottom of four out of the five wagons produced by simply keeping on hand and exchanging positions of the cheap detachable parts I furnish with the one single wagon-body.

Having thus described my invention, what I claim as new, and desire to secure by Letters Patent, is—

1. A wagon or vehicle comprising in combination, a body with hinge members on its sides, a wagon-box having removable solid ends and side-boards detachably secured together, said side-boards having hinge members detachably securable to the first-named hinge members, and means for holding the side-boards in vertical and in horizontal position, said side-boards having the stick-pockets 8 upon its edge, and the end-boards having the loops 9 engaging said pockets to hold the side-boards in their vertical position.

2. A wagon or vehicle comprising in combination, a body with hinge members on its sides, a wagon-box having removable solid ends and side-boards detachably secured together, said side-boards having hinge members detachably secured to the first-named hinge members, and means for holding the side-boards in vertical and in horizontal position, said side-boards having the stick-pockets 8 upon its edge, and the end-boards having the loops 9 engaging said pockets to hold the side-boards in their vertical position, skeleton side-boards having legs adapted to stand in the pockets 8 when the solid side-boards are in the horizontal position, and skeleton end-boards detachably securable to the ends of the skeleton side-boards.

3. A wagon or vehicle comprising in combination, a body with hinge members on its sides, a wagon-box having removable solid ends and side-boards detachably secured together, said side-boards having hinge members detachably secured to, the first-named hinge members, and means for holding the side-boards in vertical and in horizontal position, said side-boards having the stick-pockets 8 upon its edge, and the end-boards having the loops 9 engaging said pockets to hold the side-boards in their vertical position, skeleton side-boards having legs adapted to stand in the pockets 8 when the solid side-boards are in the horizontal position, and skeleton end-boards detachably securable to the ends of the skeleton side-boards, the pockets 3 upon the sides of the wagon-body adapted to receive the legs of the skeleton side-boards when said boards are closer together, and extra short skeleton end-boards detachably securable to the skeleton side-boards when the latter are in the pockets 3.

4. A wagon or vehicle comprising in combination, a body with hinge members on its sides, a wagon-box having removable solid ends and side-boards detachably secured together, said side-boards having hinge members detachably securable to the first-named hinge members, and means for holding the side-boards in vertical and in horizontal position, said side-boards having the stick-pockets 8 upon its edge, and the end-boards having the loops 9 engaging said pockets to hold the side-boards in their vertical position, the skeleton side-boards having legs adapted to stand in the pockets 8 when the solid side-boards are in the horizontal position, and skeleton end-boards detachably securable to the ends of the skeleton side-boards, the pockets 3 upon the sides of the wagon-body adapted to receive the legs of the skeleton side-boards when said boards are closer together, and extra short skeleton end-boards detachably securable to the skeleton side-boards when the latter are in the pockets 3, and the stakes 27 adapted to go in the pockets 3 when the side-boards are all removed.

5. The combination with a hay-wagon for hauling hay, of a windlass mounted thereon and having rollers adapted to carry hay-slings wound upon them.

6. The combination with a hay-wagon for hauling hay, of a windlass mounted thereon and having rollers adapted to carry hay-slings wound upon them, said rollers being connected to rotate in unison, and having a hand-crank by which to turn them.

In testimony whereof I affix my signature in presence of two witnesses.

ROBERT G. ROBERTS.

Witnesses:
HARRY CAPRON,
W. MERKERT.